United States Patent
Laursen

(10) Patent No.: US 6,728,807 B1
(45) Date of Patent: Apr. 27, 2004

(54) USING SWITCH FABRIC BLADES IN A MODULAR NETWORK TO CONNECT PORT PLATES

(75) Inventor: Soeren R. F. Laursen, Alleroed (DK)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 09/586,341

(22) Filed: Jun. 2, 2000

(51) Int. Cl.[7] ............................................. G06F 13/00
(52) U.S. Cl. ....................... 710/100; 370/357; 370/370; 370/419
(58) Field of Search ..................... 710/100, 301, 710/107, 115, 121; 370/357, 359, 419; 712/33, 39

(56) References Cited

U.S. PATENT DOCUMENTS

| | | | | |
|---|---|---|---|---|
| 5,175,728 A | * | 12/1992 | Caplan et al. ............ | 370/359 |
| 5,420,856 A | * | 5/1995 | Kerns ..................... | 370/359 |
| 5,617,547 A | * | 4/1997 | Feeney et al. .............. | 710/316 |
| 5,983,260 A | * | 11/1999 | Hauser et al. ............. | 709/201 |
| 6,105,088 A | * | 8/2000 | Pascale et al. ............. | 710/100 |
| 6,236,655 B1 | * | 5/2001 | Caldara et al. ......... | 370/395.31 |
| 6,414,953 B1 | * | 7/2002 | Lamarche et al. ......... | 370/359 |

* cited by examiner

Primary Examiner—Hassan Kizou
Assistant Examiner—Dmitry Levitan
(74) Attorney, Agent, or Firm—Fish & Richardson P.C.

(57) ABSTRACT

A network switch having a plurality of port blades, each port blade having a media port and an input and an output connection. The network switch includes a slot adapted to receive a first switch fabric blade in one of a plurality of positions. The first switch fabric blade is configured to receive a subset of the input connections and output connections from the port blades. Multiple switch fabric blades can be inserted into the slot to receive a different subset of the connections. In this manner, a low-cost modular network switch can be designed that can easily be scaled as bandwidth requirements increase.

16 Claims, 5 Drawing Sheets

USING SWITCH FABRIC BLADES IN A MODULAR NETWORK TO CONNECT PORT PLATES

BACKGROUND

This invention relates to network switching.

Telecommunications networks transfer audio, video, and other data by routing data from a source to a destination through a number of network switches. A conventional network switch includes a backplane with a number of expansion slots for receiving port blades and one or more switch fabric blades. Each port blade includes one or more media ports through which data is received and transmitted. The switch fabric blade(s) provides a high-speed switching mechanism to route data correctly between the port blades.

DESCRIPTION

Figure 1:
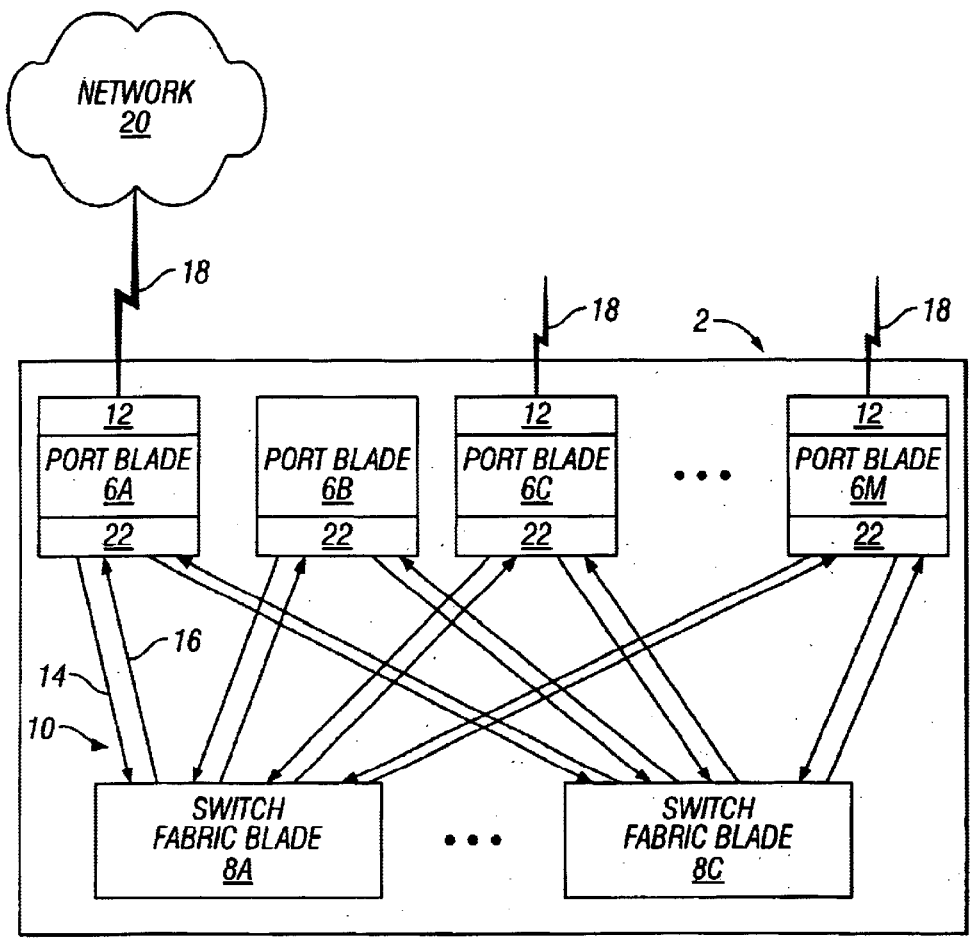
FIG. 1 is a block diagram illustrating a network switch having interconnected port blades and switch fabric blades.

FIG. 1 is a block diagram illustrating a network switch 2 in which backplane 10 provides a point-to-point connection between each port blade 6a through 6m and each switch fabric blade 8a through 8c. Network switch 2 includes a number of expansion slots 22, such as four or sixteen, for receiving and coupling a port blade 6 or a switch fabric blade 8 to backplane 10.

Several port blades 6 includes one or more media ports 12 for bi-directionally communicating via a corresponding external telecommunication link 18 to network 20, which may be a wide area network, a local area network or other digital network. Port blade 6b, also referred to as a processor blade, does not include a media port.

Each port blade 6 also includes an output connection 14 and an input connection 16 for communicating data with other port blades 6 via backplane 10 and switch fabric blades 8. Each switch fabric blade 8a through 8c provides a high-speed switching mechanism for routing data between port blades 6.

Figure 2:
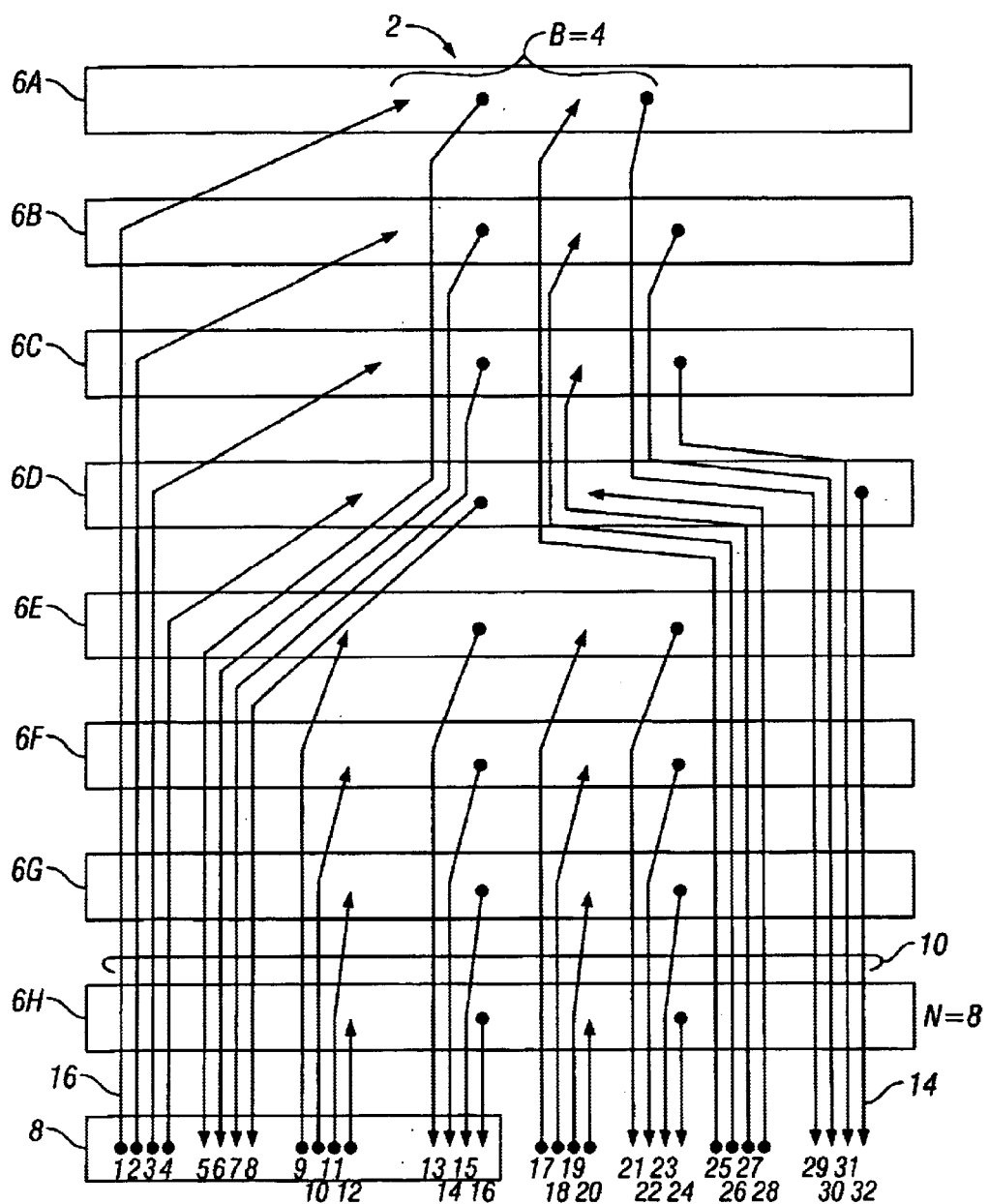
FIG. 2 is a block diagram illustrating one embodiment of network switch having a switch fabric blade in a first position.

FIG. 2 is a block diagram illustrating one embodiment of a wiring configuration for network switch 2. In the illustrated embodiment network switch 2 has nine slots for receiving up to eight port blades 6a through 6h and switch fabric blade 8.

Each port blade 6 has two output connections 14 and two input connections 16 for a total of thirty-two connections. Backplane 10 is configured to provide the input and output connections of port blades 6a through 6h to switch fabric blade 8 in groups of four. More specifically, backplane 10 provides the input and output connections from port blades 6 to pins within the switch fabric blades slot according to the following table:

TABLE 1

| Pins 1–4 | four input connections from port blades 6a through 6d |
|---|---|
| Pins 5–8 | four output connections from port blades 6a through 6d |
| Pins 9–12 | four input connections from port blades 6e through 6h |
| Pins 13–16 | four output connections from port blades 6e through 6h |
| Pins 17–20 | four input connections from port blades 6e through 6h |
| Pins 21–24 | four output connections from port blades 6e through 6h |
| Pins 25–28 | four input connections from port blades 6a through 6d |
| Pins 29–32 | four input connections from port blades 6a through 6d |

Switch fabric blade 8 occupies only a portion of one slot and is adapted to receive a subset of the input and output connections from port blades 6a through 6h. For example, in one configuration, switch fabric blade 8 is "half-width" such that it receives sixteen of the thirty-two input connections 12 and output connections 14 provided by port blades 6a through 6h.

As illustrated in FIG. 2, switch fabric blade 8 is physically inserted at a first position within a slot of network switch 2. In this configuration switch fabric blade 8 provides a point-to-point connection for all port blades 6a through 6h. In other words, switch fabric blade 8 receives input connections 16 and output connections 14 for all port blades 6a through 6h. Thus, all port blades 6a through 6h are enabled and can communicate via switch fabric blade 8 and backplane 10. However, switch fabric blade 8 provides port blades 6a through 6h with half their maximum bandwidth because only half of their input connections 16 and output connections 14 are connected.

Figure 3:
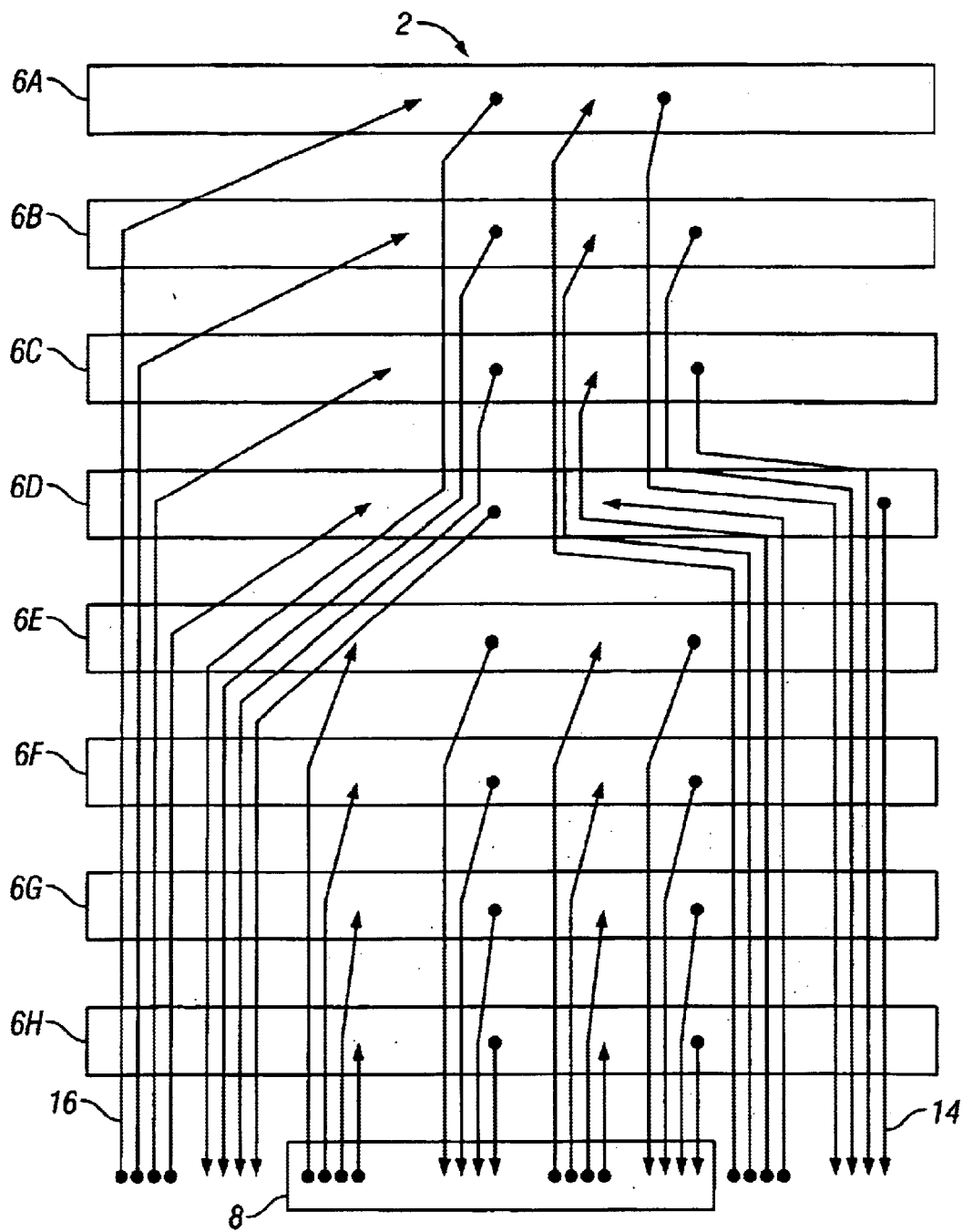
FIG. 3 is a block diagram illustrating one embodiment of network switch having a switch fabric blade in a second position.

FIG. 3 illustrates a half-width switch fabric blade 8 inserted into a second position within the slot. Physically, switch fabric blade 8 is inserted into a middle position within the slot provided by network switch 2. In this position, switch fabric blade 8 is coupled to all of the output connections 14 and input connections 16 of a subset of the port blades 6, notably, port blades 6e through 6h. Switch fabric blade 8, therefore, provides one half of the port blades 6 with their full bandwidth. The remaining port blades 6a through 6d are disabled.

Figure 4:
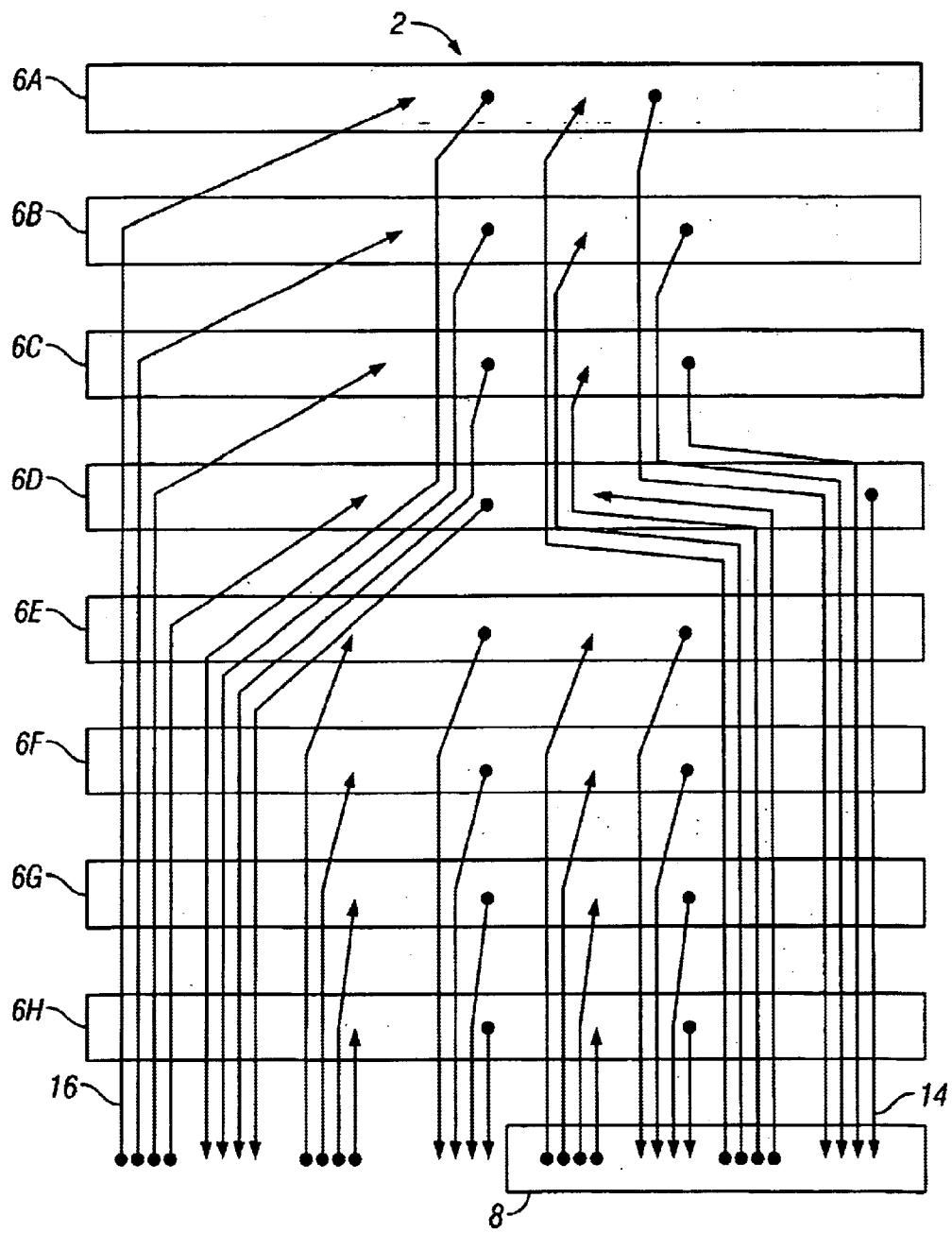
FIG. 4 is a block diagram illustrating one embodiment of network switch having a switch fabric blade in a third position.

FIG. 4 illustrates a half-width switch fabric blade 8 in a third position. In this position, switch fabric blade 8 again provides a point-to-point connection for all port blades 6a through 6h. As in the first position illustrated in FIG. 2, switch fabric blade 8 receives output connections 14 and input connections 16 from all of the port blades 6. However, only a subset of the connections are received from each port blade 6. In this manner, switch fabric blade 8 provides all port blades 6a through 6h with a specified bandwidth.

Figure 5:
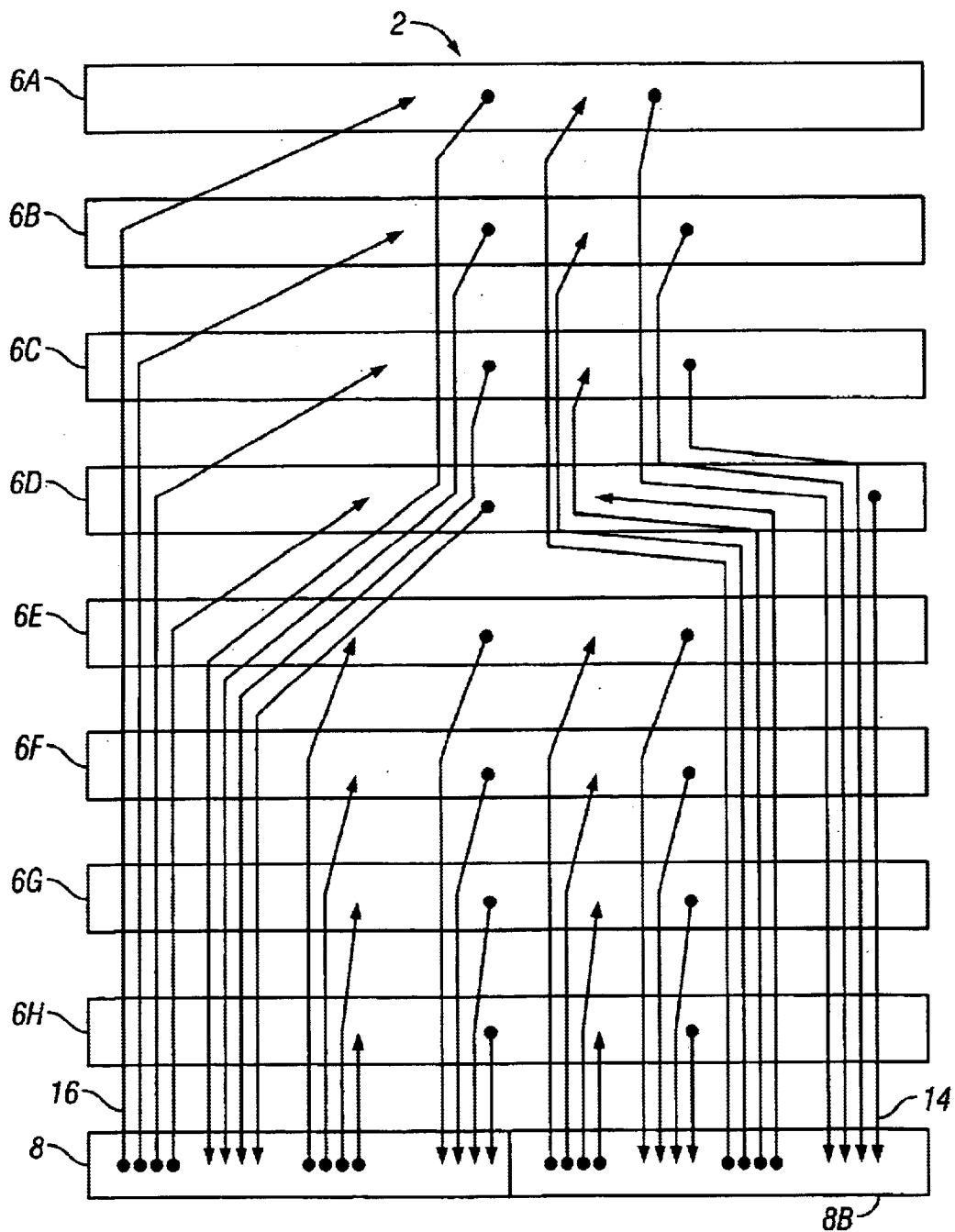
FIG. 5 is a block diagram illustrating one embodiment of network switch having two switch fabric blades sharing a single slot.

FIG. 5 illustrates network switch 2 having two half-width switch fabric blades 8a and 8b inserted into the first and third position, respectively. In this position, switch fabric blades 8a and 8b collectively receive all of the output connections 14 and input connections 16 of all port blades 6a through 6h. Thus, switch fabric blades 8a and 8b provide all port blades 6a through 6h with their full bandwidth.

FIGS. 2 through 5 illustrate network switch 2 receiving one or more switch fabric blades 8 within a single slot in order to control the bandwidth provided to each port blade. In this manner, a low-cost modular network switch can be designed that can easily be scaled as bandwidth requirements increase. This configuration can be extended to multiple switch fabric blades slots.

For example, each port blade has a bandwidth B representing a total number of input and output connections for the port blade where B equals four as shown in FIG. 2. For example, in FIG. 2, B equals four because each media 6 has a total of two output connections 14 and two input connections 16. For N port blades where N equals eight, each switch fabric blade 8 is configured to receive M inputs and outputs, where M is less than. N * B, such as in FIG. 2 where M equals N * B/2.

Furthermore, the connectors receiving the switch fabric blades are arranged such that in a first position, switch fabric blade 8 receives input and output connections from all of the port blades (FIG. 2). In a second position, switch fabric blade 8 receives all the input and output connections for a subset of the port blades 6 (FIG. 3). In a third position, switch fabric blade 8 receives input and output connections from all of the port blades 6 (FIG. 2). The first and third positions are physically separate within the slot and can be occupied by a first and second switch fabric blades such that all the input and output connections of the port blades are active.

Other embodiments are within the scope of the following claims.

What is claimed is:

1. Apparatus comprising:
    a plurality of port blades, each port blade having a media port and an input and an output connection;
    a first switch fabric blade configured to receive a subset of less than all of the inputs and outputs from the port blades; and
    a slot adapted to receive the switch fabric blade in one of different positions, wherein communication bandwidth between the port blades is a function of the position.

2. The apparatus of claim 1, wherein the slot is adapted to receive the switch fabric blade in one of three positions.

3. The apparatus of claim 1, wherein in a first position the switch fabric blade receives all of the input and output connections for a subset of the port blades.

4. The apparatus of claim 3, wherein in a second position the switch fabric blade receives input and output connections from all of the port blades.

5. The apparatus of claim 1, wherein the first switch fabric blade is configured to receive one half of the inputs and outputs from the port blades.

6. Apparatus comprising:
    a plurality of port blades, each port blade having a media port and an input and an output connection;
    a first switch fabric blade configured to receive a subset of less than all of the inputs and outputs from the port blades; and
    a second switch fabric blade configured to receive the remaining inputs and outputs from the port blades.

7. The apparatus of claim 6 further comprising a slot to receive the first and second switch fabric blades.

8. A switch fabric blade to route data between input and output connections of a plurality of port blades within a network switch, wherein the switch fabric blade is adapted for insertion at a number of positions within a slot of the network switch to receive data from fewer than all of the output and input connections of the port blades.

9. The switch fabric blade of claim 8, wherein the switch fabric blade is adapted for insertion at one of three positions within the network switch.

10. The switch fabric blade of claim 8, wherein each port blade provides B output and input connections, and further wherein for N port blade slots each switch fabric blade is configured to receive data from less than M of the input and output connections, where M equals $(N*B)/2$.

11. A method for configuring a network switch comprising:
    providing a plurality of port blades each having an input and an output connection;
    configuring a first switch fabric blade to receive less than all of the inputs and outputs from the port blades; and
    wherein said configuring the first switch fabric blade includes inserting the switch fabric blade into a slot in one of a plurality of available positions.

12. The method of claim 11, and further including controlling communication bandwidth between the port blades as a function of the position of the switch fabric blade within the slot.

13. A network switch comprising:
    a plurality of port blades, each port blade having a media port and an input and an output connection;
    a first switch fabric blade configured to receive a subset of the inputs and outputs from the port blades;
    a second switch fabric blade configured to receive a second subset of the inputs and outputs from the port blades; and
    a slot adapted to receive the first and second switch fabric blades.

14. The network switch of claim 13, wherein the first switch fabric blade is configured to receive one half of the inputs and Outputs from the port blades.

15. An apparatus comprising:
    a plurality of port blades having a total of N input and N output connections;
    a first switch fabric blade having a total of B input and output connections, where B is less than N; and
    coupling means for receiving the first switch fabric blade in a number of positions and electrically coupling the B input and output connections of the switch fabric blade to a subset of the N input and output connections of the port blades as a function of the position.

16. The network switch of claim 15, wherein the coupling means includes means for receiving a second switch fabric blade.

* * * * *